(12) United States Patent
Gehrmann et al.

(10) Patent No.: US 6,779,111 B1
(45) Date of Patent: Aug. 17, 2004

(54) INDIRECT PUBLIC-KEY ENCRYPTION

(75) Inventors: Christian Gehrmann, Hägersten (SE); Luis Barriga, Skarpnäck (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/309,151

(22) Filed: May 10, 1999

(51) Int. Cl.$^7$ .............................................. G06F 13/00
(52) U.S. Cl. ...................... 713/171; 713/161; 713/162; 380/29; 380/30; 380/259; 380/267
(58) Field of Search ................... 380/259, 267, 380/28, 29, 30; 713/189, 150, 162, 161, 168, 170

(56) References Cited

U.S. PATENT DOCUMENTS 5,696,823 A   12/1997   Blaze ........................... 380/21

OTHER PUBLICATIONS

Matsumoto, T. et al: "Speeding up Secret Computations with Insecure Auxiliary Devices", Advances In Cryptology—Crypto ' 88 Proceedings, Santa Barbara, CA, USA, Aug. 21–25, 1988, pp. 497–506, XP000345652, 1990, Berlin, West Germany, Springer–Verlag.
Kawamura S. et al: "Fast server–Aided Secret Computaion Protocols for Modular Exponentiation", IEEE Journal on Selected Areas In Communications, pp. 778–784, XP000399846, Jun. 1993, USA, vol. 11, No. 5.
Blaze, M. et al: "Divertible Protocols and Atomic Proxy Cryptography", Advances In Crypology—Eurocrypt '98, International Conference on the Theory and Application of Cryptographic Techniques Proceedings, pp. 127–144, XP 002127731, 1998, Berlin, West Germany, Springer–Verlag.
Nanbim N. et al: "Proxy Crytosystems: Delegation of the Power to Decrypt Ciphertexts", IEICE Transactions on Fundamentals of Electronics, Communication and Computer Sciences, Inst. Electron. Inf. & Commun., pp. 54–63, XP000742245, Eng. Japan, Jan. 1997.

R.L. Rivest et al., "A Method for Obtaining Digital Signatures and Public–Key Cryptosystems," Communications of the ACM vol. 21, pp. 120–126 (Feb. 1978).
M.E. Hellman, "The Mathematics of Public–Key Cryptography", Scientific American vol. 234, No. 8, pp. 146–152, 154–157 (Aug. 1979).
C.E. Shannon, "Communication Theory of Secrecy Systems", Bell System Technical Journal vol. 28, pp. 656–715 (Oct. 1949).
Y. Desmedt et al., "Shared Generation of Authenticators and Signatures", Advances in Cryptology—Crypto '91, Lecture Notes in Computer Science, vol. 537, pp. 457–469, Springer–Verlang (1991).
The Charon protocol, Which is described in A.Fox et al., "Security on the Move: Indirect Authentication Using Kerberos", Proceedings Mobicom 96 (1996).
J. Feigenbaum, "Encrypting Problem Instances, or, . . . Can you Take Advantage of someone Without Having to Trust Him", Advances in Cryptology—Crypto '85, Lecture Notes in Computer Science, vol. 218, pp. 477–488, Springer–Verlag (1986).
B. Schneier, "Applied Cryptography, Second Edition, Protocols, Algorithms, And Source Code In C", ISBN 0–471–12845–7.
M. Blaze, M. Strauss, "Atomic Proxy Cryptography", AT&T Labs —Research, Feb. 23, 1998.
Whitfield Diffee, "The First Ten Years of Public–Key Cryptography," Mar. 25, 1988, IEEE Log No. 8821645.

Primary Examiner—Norman M. Wright

(57) ABSTRACT

A system and method for encrypting data communications between a client and server utilizes an untrusted proxy server to perform computationally expensive encryption calculations which would otherwise be performed by the client. Prior to transmitting the data message to the proxy server, the client masks the data message such that the data message is indecipherable to the untrusted proxy. The untrusted proxy performs the computationally expensive encryption calculations prior to transmitting the data message to the intended receiver.

6 Claims, 2 Drawing Sheets

INDIRECT PUBLIC-KEY ENCRYPTION

BACKGROUND

The present invention relates to communications networks and to security and encryption techniques. More particularly, the present invention relates to network architectures and methods for encrypting communications data messages between clients and servers.

Modern communications often require privacy, whether for transmission of financial information in the course of electronic commerce or for transmission of trade secrets and other important commercial information. One way to protect the privacy of communications is to encrypt them according to either a symmetric cryptosystem or an asymmetric cryptosystem.

In general, a symmetric cryptosystem is a set of instructions, implemented in either hardware, software or both that can convert plaintext (the unencrypted information) to ciphertext, or vice versa, in a variety of ways, using a specific key that is known to the users but is kept secret from others. An example of a symmetric cryptosystem is the Data Encryption Standard (DES), which is described in *Data Encryption Standard*, Federal Information Processing Standards Publication 46 (1977) ("FIPS PUB 46", republished as FIPS PUB 46-1 (1988)) and *DES Modes of Operation*, FIPS PUB 81 (1980) that are available from the U.S. Department of Commerce.

An asymmetric encryption system typically employs two keys, one for encryption and one for decryption, where knowledge of one key (the public key) does not permit derivation of the second key (the private key). Various aspects of public-key cryptographic (PKC) systems are described in the literature, including R. L. Rivest et al., "A Method for Obtaining Digital Signatures and Public-Key Cryptosystems," *Communications of the ACM* vol. 21, pp. 120–126 (February 1978); M. E. Hellman, "The Mathematics of Public-Key Cryptography", *Scientific American* vol. 234, no. 8, pp. 146–152, 154–157 (August 1979); and W. Diffie, "The First Ten Years of Public-Key Cryptography", *Proceedings of the IEEE* vol. 76, pp. 560–577 (May 1988).

For either a symmetric or PKC system, the security of a message is dependent to a great extent on the length of the key, as described in C. E. Shannon, "Communication Theory of Secrecy Systems", *Bell System Technical Journal* vol. 28, pp. 656–715 (October 1949).

Many popular PKC systems use the fact that finding large prime numbers is computationally easy but factoring the products of two large prime numbers is computationally difficult. Thus, PKC permits the user's public key to be posted (e.g., in a directory or on a bulletin board), without compromising the user's private key. This public-key concept simplifies the key distribution process. Example PKC algorithms are the digital signature algorithm and secure hash algorithm (DSA/SHA) and RSA/MD5.

The RSA algorithm is described in the above-cited publication by R. L. Rivest et al. and is commonly used in a client-server processor architecture, such as that illustrated in FIG. 1, to encrypt a message M using the server's public key [e, n] resulting in ciphertext M' as follows:

$$M' = M^e \bmod n$$

This RSA encryption operation is computationally expensive for clients that currently have limited computing power, e.g., mobile phones and personal digital assistants (PDAs). As a result, the time needed for such a thin client to encrypt a message can be unacceptable.

In a client-proxy-server architecture such as that illustrated in FIG. 2, the client may be able to exploit the higher computational power of the proxy to off-load the expensive RSA encryption algorithm and reduce the client's response time. For one example, the client can simply pass the plaintext message M to the proxy, which in turn performs a full RSA encryption. For another, better example, the client can "lightly encrypt" the plaintext message M, forming a ciphertext m with an algorithm that is less computationally expensive than RSA, and then securely pass the "lightly encrypted" message m to the proxy, which in turn performs a full encryption, forming the ciphertext M'. (It will be appreciated that some form of authentication would typically be used between the client and the proxy.)

The problem with these examples is the absence of end-to-end, client-server security. Indeed, the client must trust the proxy because the proxy has easy access to the plaintext M. Applicants invention achieves end-to-end, client-server security at the same time as a computationally expensive encryption algorithm is off-loaded to an untrusted proxy, i.e., without revealing the plaintext to the proxy.

General aspects of the problem of computing with encrypted data are described in B. Schneier, *Applied Cryptography* 2d ed., sections 4.8 and 23.6, pp. 85–86 and 540–541, John Wiley & Sons (1996). Also, the publication by Y. Desmedt et al., "Shared Generation of Authenticators and Signatures", *Advances in Cryotology—Cryoto'91*, Lecture Notes in Computer Science, vol. 537, pp. 457–469, Springer-Verlag (1991) describes group signatures, which are schemes where a given number of individuals can collectively generate a single secure signature without interaction among the individuals and without revealing the secret key to any of them.

The Charon protocol, which is described in A. Fox et al., "Security on the Move: Indirect Authentication Using Kerberos", *Proceedings Mobicom 96* (1996), provides indirect authentication using a trusted proxy for the Kerberos authentication protocol.

The Internet publication, M. Blaze et al., "Atomic Proxy Cryptography", www.research.att.com, AT&T Labs—Research (Feb. 23, 1998), describes atomic proxy cryptography, in which an atomic proxy function with a proxy key converts ciphertext for a key $k_1$ into ciphertext for another key $k_2$.

In J. Feigenbaum, "Encrypting Problem Instances, or, . . . Can You Take Advantage of Someone without Having to Trust Him", *Advances in Coytology—Coyto'85*, Lecture Notes in Computer Science, vol. 218, pp. 477–488, Springer-Verlag (1986), a method for computing with encrypted data is described, where a party A lacks the computational power to perform a calculation and lets another untrusted party B with more computing power do a partial calculation. The result of this is further used by the original party A to compute the final result using a simpler operation.

U.S. Pat. No. 5,696,823 to Blaze describes a way to use an untrusted high-bandwidth device for block symmetric encryption on behalf of a secure low-bandwidth device. PKC is used for authentication or key exchange in the symmetric cryptographic protocols, not for information data encryption. The patent is directed to symmetric encryption, not the problem of public key encryption "on the fly". Also, the host does not only act as a proxy; calculations made by the host must be performed if it should be possible to encrypt or decrypt a message, and the cleartext is located in the insecure device after decryption. Thus, the host is "untrusted" only with respect to the secret key, not with respect to the data to be encrypted.

None of these publications solves the problem addressed by Applicants' invention, which provides end-to-end, client-server security at the same time as a computationally expensive encryption algorithm is off-loaded to an untrusted proxy, i.e., without revealing the plaintext to the proxy.

SUMMARY

The present invention addresses certain shortcomings in the art by providing a network architecture and method for providing secure (e.g., encrypted) communications between a client and server that enables computationally expensive encryption calculations to be performed by a proxy server, rather than by the client. In other words, the methods of the present invention enable the client to delegate certain computationally expensive encryption calculations to the proxy server. Delegating these computations is particularly advantageous for "thin" clients (e.g., devices which are characterized by limited processing power, transmission bandwidth, and/or memory). Delegating these computations enables a thin client to utilize more advanced encryption algorithms, thereby enhancing the security of the communications link between the client and the server.

Advantageously, the present invention enables the client to delegate computations to an untrusted proxy server. An untrusted proxy server does not have access to the data message. The use of an untrusted proxy server further enhances the security of the data transmitted between the client and the server. Further, the present invention provides a system and method for indirect encryption that effectively reduces the on-line computation time at the client required by a PKC algorithm such as RSA by using idle computing cycles of the client and by using less computing-intensive cryptographic functions.

In one aspect of the invention, a method of encrypting information includes the steps of generating a random value; computing a second value based on the random value and a publickey associated with an intended recipient of the information; masking the information with the random value based on the public key; communicating the masked information and the second value to an untrusted proxy; and encrypting the information in the untrusted proxy based on the masked information, the second value, and the public key. The method may further include the step of communicating the encrypted information to the intended recipient. The masking step may include multiplying the information by the random value.

In the context of a communications network adapted to maintain RSA public-key encrypted communications sessions between one or more servers having a public encryption key and one or more clients, another aspect of the invention provides a method of transmitting information messages between a client and a server while using the computational services of an untrusted proxy, comprising the steps of generating, in a processor located in the communications network a random value; computing, in a processor located at a client, a second value based on the random value and a public key associated with a server on the network; masking the information message with the random value; transmitting to untrusted proxy the masked information message and the second value; encrypting the masked information message in a processor at the untrusted proxy; and transmitting the encrypted information message from the untrusted proxy to the server.

In another aspect, the invention provides a communications network architecture capable of maintaining RSA public-key encrypted communications sessions between one or more servers having a public encryption key and one or more clients, comprising at least one server for maintaining communications sessions with clients, the server having at least one public encryption key associated therewith; at least one client having a processing module operational to generate a code value based on a random number and to mask an information message based upon the random number and a communications module operational to transmit the code value and the masked information message to the untrusted proxy server; and an untrusted proxy server interposed between the server and the client in the communications path and adapted to receive the code value and the masked information message from the client and to encrypt the information message for transmission to the server.

BRIEF DESCRIPTION OF THE DRAWINGS

Applicants' invention will be understood by reading this description in conjunction with the drawings, in which.

DETAILED DESCRIPTION

Applicants' invention achieves end-to-end, client-server security at the same time as a computationally expensive encryption algorithm is off-loaded to an untrusted proxy. This processor architecture is illustrated in FIG. 3 and a flow chart of a method in accordance with Applicants' invention is illustrated in FIG. 4.

Figure 1:
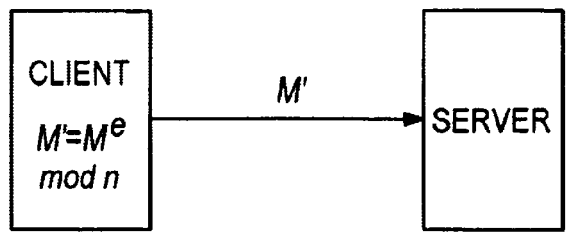
FIG. 1 illustrates encryption in a client-server processor architecture.
Figure 2:
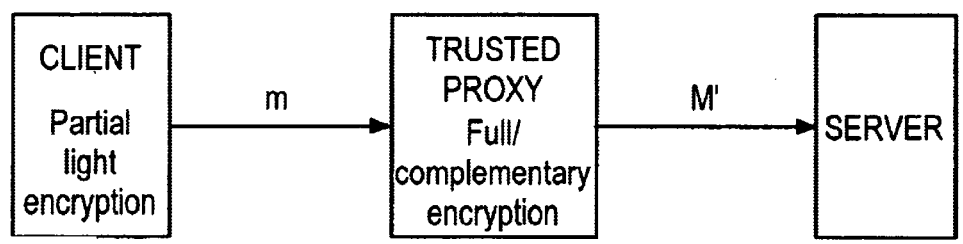
FIG. 2 illustrates encryption in a client-proxy-server processor architecture.
Figure 3:
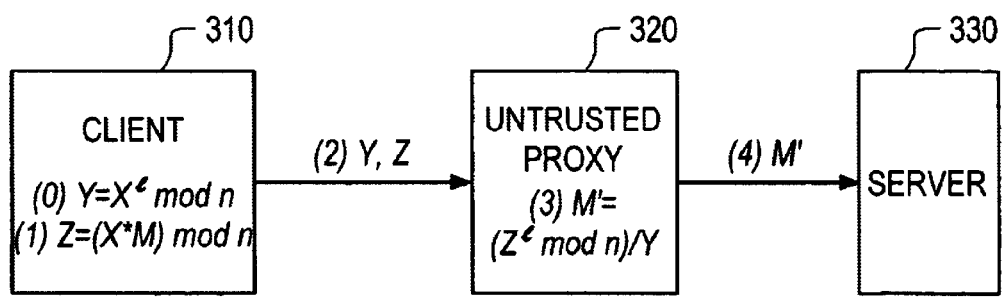
FIG. 3 illustrates encryption in a client-proxy-server processor architecture according to Applicants' invention.
Figure 4:
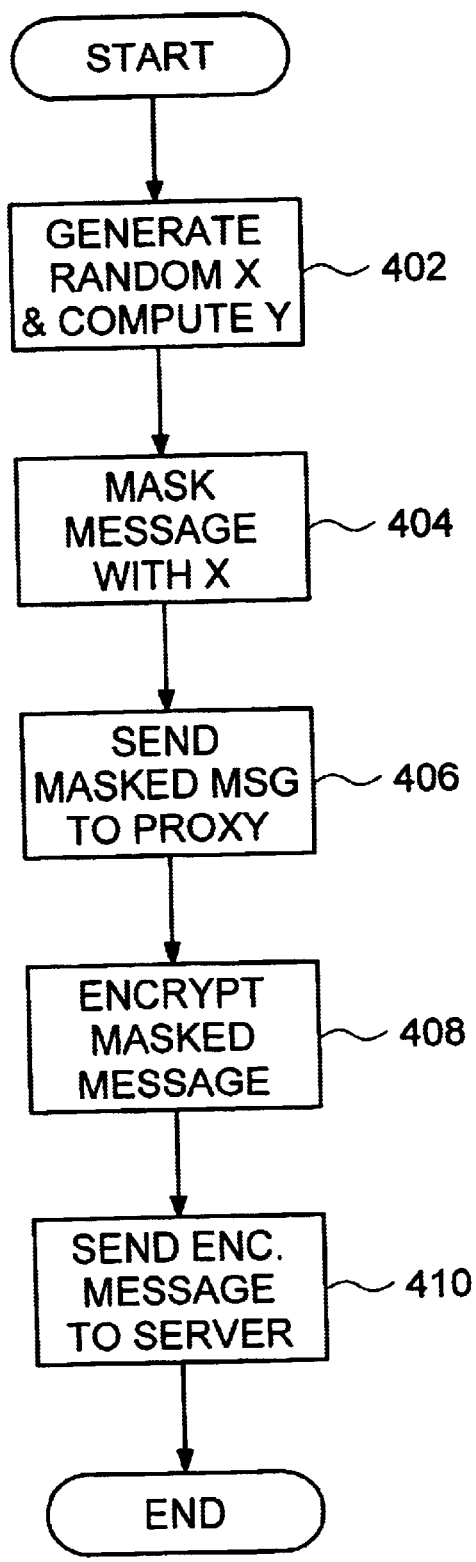
FIG. 4 is a flow chart of a method in accordance with Applicants' invention.

Referring to FIG. 3 there is illustrated a simplified, schematic depiction of a network architecture according to one embodiment of the present invention. More specifically, FIG. 3 depicts a client-proxy-server architecture for maintaining a secure, or encrypted, communications session between client 310 and server 330. Advantageously, client 310 may delegate to proxy 320 many of the computationally expensive calculations for encrypting information messages between client 310 and server 330 without revealing the content of the information message to proxy 320. The ability of client 310 to delegate computationally expensive calculations for encrypting information messages enables thin clients to utilize advanced encryption procedures such as, for example, RSA public-key encryption algorithms. This represents an advance in the state of the art for thin-client encryption technology.

In one embodiment, client 310 is a thin client. As used herein, the term thin client shall refer to an information appliance having relatively limited processing capability, transmission bandwith, and/or memory. Such thin clients typically include a communications module for transceiving information streams from other devices, a processing module for processing information, and a memory module having limited memory. Typical examples of thin clients include cellular telephones, personal digital assistants (PDA's), palmtop or even some laptop computers, remote monitoring devices, etc. This list is not meant to be limiting and one of ordinary skill in the art will recognize many additional examples of thin clients. Additionally, while the present invention is particularly useful when used in conjunction with a thin client device, one of ordinary skill in the art will recognize that methods of the present invention are applicable to client devices other than thin clients.

Server 330 is a server capable of managing communications sessions with client 310. Servers typically include a programmable processor, memory and input/output means. Specific functionality may be imparted to server 330 by software stored in the server's memory and operational to run on the server's processor. The particular nature of the communications session server 330 manages is not critical to the present invention. Server 330 may be, for example, an applications server such as an e-mail server, a video server, or a data server. Alternatively, server 330 may be a gateway server to a network-centric data center, in which case various applications servers and memory servers would be 'behind' server 330 in the data center. One of ordinary skill in the art will recognize that communications servers are readily commercially available. Examples include Unix-based servers such as the Enterprise commercially available from Sun Microsystems, Inc. Palo Alto, Calif., USA and Windows NT based servers, which typically have processors made by, or compatible with, Pentium® processors made by Intel Corporation, Santa Clara Calif., USA.

Proxy 320 may also be a server having the capability to manage communications sessions with clients. Proxy 320 also includes a processor, memory and input/output means substantially as described in connection with server 330. One of ordinary skill in the art will recognize that proxy 320 operates as a client of server 330 and as a server to client 310.

Client 310, proxy 320 and server 330 are connected by a communications network that preferably supports two-way communication between these network elements. The particular details of the communications network are not critical to the present invention. The communications links between client 310, proxy 320 and server 330 may be wireless or wireline, connectionless or connection-oriented, and of fixed or variable bandwidth. Additionally, the communications network may, and probably will, include numerous additional network elements such as switches, routers, multiplexers and demultiplexers that are not critical to the present invention and, accordingly are not shown. The ability to configure a communications network suitable for implementing the present invention is within one of ordinary skill in the communications arts.

Having set forth a network architecture suitable for implementing the present invention, a method for implementing the present invention will now be explained. Referring to FIGS. 3 and 4, let M be the secret message that has to be encrypted with the server's public key [e, n]. In the first step of the method (step 402), client 310 generates a random number X, where X∈[0, n−1], and computes $Y=X^e$ mod n. The random number X can be generated in any convenient way, e.g., by observation of a suitable physical phenomena or retrieval of a suitable value from a look-up table. Alternatively, the number X can be pseudorandom and generated by execution of a suitable algorithm or retrieval of a suitable value from a look-up table.

The values X and Y can advantageously be generated using otherwise idle cycles of the client processor, but this is not necessary of course. Moreover, these values can be generated while client 310 is "off-line", i.e., not in communication with proxy 320 and server 330. Indeed, some of the following steps in the method can also be performed off-line, depending on the nature of the message M.

It will be appreciated that client 310 must know server's 330 public key [e, n] for step 402 to occur off-line. This knowledge may have been gained during a previous session with server 330. This case is expected to be common. For example, client 310 can have cached the server's public key during a previous contact with the server or when the server's public key has been distributed securely to the client. The server's public key can also be entered into client 310 in other ways, e.g., manually or upon configuration.

In the next step of the method (step 404), client 310 masks the message M with the random number X, viz., client 310 forms Z=(X·M) mod n. This will be recognized as a form of Vernam cipher, encrypting M by multiplying it by a one-time pad X. Although it is possible to re-use the one-time pad, i.e., to mask a new message without incurring the expense of computing a new X, it may be desirable to restrict such re-use in order to provide less material for cryptanalysis.

If the message M is not such that it is generated in real time for immediate transmission to server 330, the computation of Z can also occur off-line. As just one of many possible examples, such a message might be a predetermined response to a set of predetermined conditions. On the other hand, if the message M is generated and then immediately transmitted, the computation of Z occurs while client 320 is in communication with server 330. As just one of many possible examples, such a message might be a voice or other data communication.

In either case after establishing communication at least with proxy 320, client 310 sends the values Y and Z to the untrusted proxy 320 (step 406). The untrusted proxy 320 computes (step 408) the encrypted message M' using Z and Y according to the following:

$$(Z^e \bmod n)/Y = ((X \cdot M)^e \bmod n)/(X^e \bmod n) = M^e \bmod n = M'$$

and after being computed, the encrypted message M' is sent by the untrusted proxy 320 to the server 320 (step 410).

According to this method, client 310 does not directly compute M', but instead indirectly computes M' with the help of the untrusted proxy 320, using the untrusted proxy's computing power.

One of ordinary skill in the communications arts will appreciate that the computations expressed herein as steps of a method may be performed by one or more processors resident in the client, the proxy, and/or the server. The logic necessary to perform the steps may be implemented in hardware, for example in a dedicated processor or in software on a general purpose processor. One of ordinary skill in the communications arts is capable of designing logic to implement the steps disclosed herein without undue experimentation.

It currently appears that in handling an encrypted message M' sent by server 332 to client 320, client 310 cannot use the computing power of the untrusted proxy 320 for decryption because this seems to require that proxy 326 has access to the private key. Thus, proxy 320 would not be untrusted.

The security of this method in accordance with Applicants' invention is based on two well-known cryptographic facts. First, given that X, where X∈[0, n−1], is chosen uniformly at random, the information about M given Z=(X·M) mod n is zero according to the publication by Shannon that is cited above. Second, to find X or get any information about X given $X^e$ mod n, where [e, n] are RSA public key values, is computationally infeasible according to the publication by Rivest et al. that is cited above.

It is not currently known whether these methods can be applied in cryptographic systems other than RSA, e.g., a Diffie-Hellman system, systems based on elliptic curves, and even symmetric cryptosystems because the mathematical foundations of other systems are different from the mathematical foundation of the RSA cryptosystem.

Compared to conventional RSA encryption, Applicants' method results in a larger message being sent to proxy 320 in that the message contains the Y value. It is possible to hide this extra cost by sending to proxy 320 the Y value as soon as it is computed, i.e., before starting the session with the server.

Applicants' invention enables devices having low computing power, e.g., thin terminals such as mobile phones or PDAs, to have faster response times by using the higher computing power of an untrusted proxy while still keeping end-to-end security. Without Applicants' invention, the response times of such devices would be longer due to the heavy, time-consuming, on-line PKC computations.

The preceding describes a scenario where a thin client like a mobile phone or PDA wants to perform PKC by using an untrusted proxy. This same method can be used for a smart card using an insecure high-bandwidth device to perform part of the encryption as described in the patent to Blaze cited above.

It will be appreciated by those of ordinary skill in the art that this invention can be embodied in other specific forms without departing from its essential character. The embodiments described above should therefore be considered in all respects to be illustrative and not restrictive.

What is claimed is:

1. A method of transmitting information from a first device to a second device, said method comprising the steps of:

generating, by said first device, a random value (X);

computing, by said first device, a second value (Y) based on the random value and a public key associated with said second device;

masking, by said first device, the information (M) using the random value (X);

transmitting the masked information (Z) and the second value (Y) from said first device to an untrusted proxy;

generating, by said untrusted proxy, an encrypted form (M') of the information (M) based on the masked information (Z), and the second value (Y), received from said first device; and transmitting said encypted information (M') from said untrusted proxy to said second device.

2. The method of claim 1, wherein the masking step comprises multiplying the information by the random value.

3. The method recited in claim 1, wherein said random number (X) conforms to $X \in [0, n-1]$.

4. The method recited in claim 1, wherein said public key is identified by [e, n], and wherein said second value (Y) is identified by $Y = X^e$ mod n.

5. The method recited in claim 1, wherein the stop of masking said information (M) using said random number (X) conforms to $Z = (X \cdot M)$ mod n, where M is the information and Z is the masked information.

6. The method recited in claim 1, wherein said step of encrypting, by said untrusted proxy, the information (M) based on the masked information (Z) and the second value (Y) comprises the step of computing $(Z^e \bmod n)/Y = ((X \cdot M)^e \bmod n)/(X^e \bmod n) = M^e \bmod n = M'$, where M' is the enrypted information.

* * * * *